(12) United States Patent
Ren

(10) Patent No.: US 10,780,320 B2
(45) Date of Patent: Sep. 22, 2020

(54) INTELLIGENT TREADMILL AND METHOD FOR CONTROLLING THE SAME

(71) Applicant: XIAMEN XIN AOLI ELECTRICAL APPLIANCE CO., LTD., Xiamen (CN)

(72) Inventor: Yang-Jie Ren, Xiamen (CN)

(73) Assignee: Xiamen Xin Aoli Electrical Appliance Co., Ltd., Fujian (CN)

( * ) Notice: Subject to any disclaimer, the term of this patent is extended or adjusted under 35 U.S.C. 154(b) by 117 days.

(21) Appl. No.: 15/750,529

(22) PCT Filed: Apr. 17, 2016

(86) PCT No.: PCT/CN2016/079525
§ 371 (c)(1),
(2) Date: Feb. 6, 2018

(87) PCT Pub. No.: WO2017/166340
PCT Pub. Date: Oct. 5, 2017

(65) Prior Publication Data
US 2018/0229082 A1 Aug. 16, 2018

(30) Foreign Application Priority Data

Apr. 1, 2016 (CN) .......................... 2016 1 0204655

(51) Int. Cl.
*A63B 24/00* (2006.01)
*A63B 22/02* (2006.01)
*G01M 1/12* (2006.01)

(52) U.S. Cl.
CPC .......... *A63B 24/0087* (2013.01); *A63B 22/02* (2013.01); *A63B 22/025* (2015.10);
(Continued)

(58) Field of Classification Search
CPC ..... A63B 24/0087; A63B 22/02; A63B 24/00; A63B 22/025; A63B 2024/0093; A63B 2220/805; G01M 1/122
See application file for complete search history.

(56) References Cited

U.S. PATENT DOCUMENTS 5,690,587 A * 11/1997 Gruenangerl .......... A63B 22/02
482/54
5,800,314 A * 9/1998 Sakakibara ............ A63B 22/02
482/1
(Continued)

FOREIGN PATENT DOCUMENTS

CN 101291709 A 10/2008
CN 201906415 U 7/2011
(Continued)

OTHER PUBLICATIONS

Office Action and Search Report for Chinese Patent Application No. 201610204655.X, dated Oct. 9, 2017.
(Continued)

*Primary Examiner* — Andrew S Lo
(74) *Attorney, Agent, or Firm* — Rosenberg, Klein & Lee

(57) ABSTRACT

An intelligent treadmill includes a treadmill body and an intelligent speed control system. The treadmill body includes a treadmill deck and a motor. The treadmill deck includes an acceleration section, a holding section, and a deceleration section. The intelligent speed control system includes a gravity-center sensing device, a processor module, a motor driver, and a host computer. The gravity-center sensing device includes a plurality of infrared array sensors. The gravity-center sensing device is sequentially connected with the processor module, the motor driver and the host computer. The motor driver is connected with the motor. A method for controlling the intelligent treadmill includes the steps of: step 1: allowing a user to set upper and lower limit
(Continued)

values of the position of the holding section; step 2: allowing the user to set a speed adjustment ratio value; step 3: acquiring the position of the center of gravity of a human body; step 4: detecting whether the center of gravity of the human body is within the holding section; step 5: detecting whether the center of gravity of the human body is within the acceleration section; step 6: the processor module detecting whether the center of gravity of the human body is within the deceleration section. It is convenient for the user to quickly and intelligently control the speed of the treadmill. The user can feel more safe and stable during exercise.

8 Claims, 5 Drawing Sheets

(52) U.S. Cl.
CPC .............. *A63B 24/00* (2013.01); *G01M 1/122* (2013.01); *A63B 2024/0093* (2013.01); *A63B 2220/805* (2013.01)

(56) References Cited

U.S. PATENT DOCUMENTS

| | | | | |
|---|---|---|---|---|
| 6,135,924 | A * | 10/2000 | Gibbs | A63B 22/02 482/51 |
| 7,094,180 | B2 * | 8/2006 | Huang | A63B 22/02 482/51 |
| 7,862,475 | B2 * | 1/2011 | Watterson | A63B 22/0242 482/4 |
| 8,082,811 | B2 * | 12/2011 | Udono | B25J 19/0095 73/865.9 |
| 8,403,816 | B2 * | 3/2013 | Park | A63B 21/0053 482/54 |
| 8,460,162 | B2 * | 6/2013 | Park | A61H 1/0262 482/1 |
| 8,480,541 | B1 * | 7/2013 | Brunts | A63B 22/0242 482/1 |
| 8,956,268 | B2 * | 2/2015 | Huang | A63B 71/0054 482/51 |
| 9,622,686 | B1 * | 4/2017 | Berme | A61B 5/112 |
| 9,763,604 | B1 * | 9/2017 | Berme | A63B 69/0053 |
| 9,916,011 | B1 * | 3/2018 | Berme | G01L 5/16 |
| 9,975,003 | B2 * | 5/2018 | Molins | A63B 22/025 |
| 10,016,656 | B2 * | 7/2018 | Devor | A63B 24/0087 |
| 10,117,602 | B1 * | 11/2018 | Berme | A61B 5/0077 |
| 10,216,262 | B1 * | 2/2019 | Berme | G06F 3/011 |
| 10,258,828 | B2 * | 4/2019 | Dalebout | A63B 24/0087 |
| 10,272,317 | B2 * | 4/2019 | Watterson | A63B 71/0686 |
| 10,286,286 | B1 * | 5/2019 | Ryan | A63B 22/025 |
| 10,293,210 | B2 * | 5/2019 | Wei | A63B 24/0087 |
| 2009/0036272 | A1 * | 2/2009 | Yoo | A63B 22/0257 482/7 |
| 2010/0210419 | A1 * | 8/2010 | Park | A63B 21/0053 482/7 |
| 2019/0054344 | A1 * | 2/2019 | Athey | A63B 22/02 |

FOREIGN PATENT DOCUMENTS

| | | |
|---|---|---|
| CN | 104971466 A | 10/2015 |
| CN | 104971466 B | 10/2015 |
| CN | 204684549 U | 10/2015 |
| CN | 105288941 A | 2/2016 |
| JP | 2001198234 A | 7/2001 |
| JP | 2009542407 A | 12/2009 |
| KR | 20020013649 | 2/2002 |
| KR | 20070015687 | 2/2007 |
| KR | 20140144868 A | 12/2014 |

OTHER PUBLICATIONS

Office Action and Search Report for Japanese Patent Application No. 2018-508738, dated Dec. 4, 2018.
Office Action and Search Report for Korean Patent Application No. 10-2018-7004109, dated Nov. 21, 2018.

\* cited by examiner

Step 1: allowing a user to set upper and lower limit values of the position of a holding section on a host computer;

Step 2: allowing the user to set a speed adjustment ratio value on the host computer;

Step 3: acquiring the position of the center of gravity of a human body by infrared array sensors;

Step 4: detecting whether the center of gravity of the human body is within the holding section by a processor module, if the center of gravity of the human body is not within the holding section, executing the next step, if the center of gravity of the human body is within the holding section, returning to the step 3;

Step 5: detecting whether the center of gravity of the human body is within an acceleration section by the processor module, if the center of gravity of the human body is not within the acceleration section, executing the next step, if the center of gravity of the human body is within the acceleration section, transmitting an acceleration signal to a motor driver, actuating the motor driver to accelerate a motor, thereby completing a speed control of the treadmill;

Step 6: detecting whether the center of gravity of the human body is within a deceleration section by the processor module, if the center of gravity of the human body is not within the deceleration section, returning to the step 3, if the center of gravity of the human body is within the deceleration section, transmitting a deceleration signal to the motor driver, actuating the motor driver to decelerate the motor, thereby completing the speed control of the treadmill.

FIG. 2

Step 31: the infrared array sensors acquiring footstep position data of the human body and transmitting the data to the processor module for processing;

Step 32: the processor module comparing present footstep position data with last footstep position data, if the present footstep position data is greater than the last footstep position data, returning to the step 31, if the present footstep position data is less than the last footstep position data, executing the next step;

Step 33: saving the last footstep position data and recording it as a maximum value X1 of the data, at this moment, the footstep of the human body being closest to a front end of the treadmill;

Step 34: the infrared array sensors continuing to acquire the footstep position data of the human body and continuing to transmit the data to the processor module for processing;

Step 35: the processor module comparing the present footstep position data with the last footstep position data, if the present footstep position data is less than the last footstep position data, returning to the step 34, if the present footstep position data is greater than the last footstep position data, executing the next step;

Step 36: saving the last footstep position data and recording it as a minimum value X2 of the data, at this moment, the footstep of the human body being closest to a rear end of the readmill;

Step 37: calculating and acquiring position data X of the center of gravity of the human body, $X = (X1+X2)/2$.

FIG. 3

Step 311: the infrared array sensors acquiring the footstep position data of the human body;

Step 312: the processor module detecting whether both feet of the human body are on the treadmill deck, if it is detected that both feet of the human body are on the treadmill deck, returning to the step 311, if it is not detected that both feet of the human body are on the treadmill deck, executing the next step;

Step 313: the processor module detecting whether both feet of the human body swing on the treadmill deck, if it is detected that both feet of the human body swing on the treadmill deck, returning to the step 311, if it is not detected that both feet of the human body swing on the treadmill deck, the present state being one-legged, and executing the next step;

Step 314: the processor module comparing the present footstep position data with the last footstep position data, if the present footstep position data is equal to the last footstep position data, returning to the step 311, if the present footstep position data is not equal to the last footstep position data, saving the present footstep position data;

Step 315: accumulating the present footstep position data until it reaches a preset cumulative number;

Step 316: detecting the cumulative number, if the accumulated number reaches the preset cumulative number, averaging the accumulated present footstep position data to acquire and save an average value of the saved footstep position data, if the accumulated number doesn't reach the preset cumulative number, executing the step 314.

FIG. 4

Step 3110: setting infrared transmitting and receiving channels of the infrared array sensors;

Step 3111: delaying a stabilization circuit;

Step 3112: turning on the infrared array sensors to perform infrared emission;

Step 3113: detecting whether the infrared array sensors receive a signal, if the infrared array sensors receive the signal, indicating that there is no obstacle, if the infrared array sensors do not receive the signal, indicating that there is an obstacle, the position of the obstacle being the footstep position of the human body, and recording corresponding data;

Step 3114: recording data until all the infrared channels are scanned and saving the data.

FIG. 5

INTELLIGENT TREADMILL AND METHOD FOR CONTROLLING THE SAME

FIELD OF THE INVENTION

The present invention relates to fitness equipment and electronic control technology, and more particularly to an intelligent treadmill and a method for controlling the same.

BACKGROUND OF THE INVENTION

As people pay more attention to fitness, there are various fitness devices on the market. Treadmills are often used as fitness equipment. When in use, the user needs to manually set the speed of the treadmill belt by using a button, a knob, a remote control or a screen on the treadmill. Afterwards, the treadmill belt is driven by a motor to run at a set speed, so that the user can conveniently run on the treadmill belt at the set speed. However, during running, the user often has the requirement of a speed change. In this case, the user needs to manually operate the button, knob, remote control or screen on the treadmill to achieve the operation for a speed change. It is inconvenient for the user complete the appropriate operation during the running process. For the user who may have poor physical flexibility for operation, there will be some dangers. This will cause some limitations during exercise.

Accordingly, the inventor of the present invention has devoted himself based on his many years of practical experiences to solve these problems and develop an intelligent treadmill and a method for controlling the same.

SUMMARY OF THE INVENTION

The primary object of the present invention is to provide an intelligent treadmill and a method for controlling the same to accurately judge the exercise state of the user on the treadmill and realize the precise somatosensory control of the running of the treadmill. It is convenient for the user to quickly and intelligently control the speed of the treadmill. The user can feel more safe and stable during exercise.

According to one aspect of the present invention, an intelligent treadmill is provided. The intelligent treadmill comprises a treadmill body and an intelligent speed control system. The treadmill body includes a treadmill deck and a motor. The treadmill deck is provided with a treadmill belt connected with the motor. The treadmill deck includes an acceleration section, a holding section, and a deceleration section. The intelligent speed control system includes a gravity-center sensing device, a processor module, a motor driver, and a host computer. The gravity-center sensing device includes a plurality of infrared array sensors. The infrared array sensors are arranged at left and right sides of the treadmill deck, respectively. The gravity-center sensing device is sequentially connected with the processor module, the motor driver and the host computer. The motor driver is connected with the motor.

Preferably, the infrared array sensors are uniformly arranged at the left and right sides of the treadmill deck, respectively.

Preferably, the numbers of the infrared array sensors in the acceleration section, the holding section and the deceleration section are adjustable.

Preferably, the host computer is a man-machine interface.

According to another aspect of the present invention, a method for controlling an intelligent treadmill, including the steps of:

step 1: allowing a user to set upper and lower limit values of the position of a holding section on a host computer;

step 2: allowing the user to set a speed adjustment ratio value on the host computer;

step 3: acquiring the position of the center of gravity of a human body by infrared array sensors;

step 4: detecting whether the center of gravity of the human body is within the holding section by a processor module, if the center of gravity of the human body is not within the holding section, executing the next step, if the center of gravity of the human body is within the holding section, returning to the step 3;

step 5: detecting whether the center of gravity of the human body is within an acceleration section by the processor module, if the center of gravity of the human body is not within the acceleration section, executing the next step, if the center of gravity of the human body is within the acceleration section, transmitting an acceleration signal to a motor driver and thereby actuating the motor driver to accelerate a motor to complete a speed control of the treadmill, wherein, an acceleration adjustment amount=(an actual position of the center of gravity−the upper limit value)*the speed adjustment ratio value;

step 6: detecting whether the center of gravity of the human body is within a deceleration section by the processor module, if the center of gravity of the human body is not within the deceleration section, returning to the step 3, if the center of gravity of the human body is within the deceleration section, transmitting a deceleration signal to the motor driver and thereby actuating the motor driver to decelerate the motor to complete the speed control of the treadmill, wherein, a deceleration adjustment amount=(the lower limit value−the actual position of the center of gravity)*the speed adjustment ratio value.

Preferably, the step 3 includes:

step 31: the infrared array sensors acquiring footstep position data of the human body and transmitting the data to the processor module for processing;

step 32: the processor module comparing present footstep position data with last footstep position data, if the present footstep position data is greater than the last footstep position data, returning to the step 31, if the present footstep position data is less than the last footstep position data, executing the next step;

step 33: saving the last footstep position data and recording it as a maximum value X1 of the data, at this moment, the footstep of the human body being closest to a front end of the treadmill;

step 34: the infrared array sensors continuing to acquire the footstep position data of the human body and continuing to transmit the data to the processor module for processing;

step 35: the processor module comparing the present footstep position data with the last footstep position data, if the present footstep position data is less than the last footstep position data, returning to the step 34, if the present footstep position data is greater than the last footstep position data, executing the next step;

step 36: saving the last footstep position data and recording it as a minimum value X2 of the data, at this moment, the footstep of the human body being closest to a rear end of the treadmill;

step 37: calculating and acquiring position data X of the center of gravity of the human body, $X=(X_1+X_2)/2$.

Preferably, the step 31 includes:

step 311: the infrared array sensors acquiring the footstep position data of the human body;

step 312: the processor module detecting whether both feet of the human body are on the treadmill deck, if it is detected that both feet of the human body are on the treadmill deck, returning to the step 311, if it is not detected that both feet of the human body are on the treadmill deck, executing the next step;

step 313: the processor module detecting whether both feet of the human body swing on the treadmill deck, if it is detected that both feet of the human body swing on the treadmill deck, returning to the step 311, if it is not detected that both feet of the human body swing on the treadmill deck, the present state being one-legged, and executing the next step;

step 314: the processor module comparing the present footstep position data with the last footstep position data, if the present footstep position data is equal to the last footstep position data, returning to the step 311, if the present footstep position data is not equal to the last footstep position data, saving the present footstep position data;

step 315: accumulating the present footstep position data until it reaches a preset cumulative number;

step 316: detecting the cumulative number, if the accumulated number reaches the preset cumulative number, averaging the accumulated present footstep position data to acquire and save an average value of the saved footstep position data, if the accumulated number doesn't reach the preset cumulative number, executing the step 314.

Preferably, the step 311 includes:

step 3110: setting infrared transmitting and receiving channels of the infrared array sensors;

step 3111: delaying a stabilization circuit;

step 3112: turning on the infrared array sensors to perform infrared emission;

step 3113: detecting whether the infrared array sensors receive a signal, if the infrared array sensors receive the signal, indicating that there is no obstacle, if the infrared array sensors do not receive the signal, indicating that there is an obstacle, the position of the obstacle being the footstep position of the human body, and recording corresponding data;

step 3114: recording data until all the infrared channels are scanned and saving the data.

The present invention has a reasonable structure and an ingenious design and can intelligently control the speed of the treadmill by sensing the position of the center of gravity of the human body to accurately judge the exercise state of the user on the treadmill and realize the precise somatosensory control of the running of the treadmill. It is convenient for the user to quickly and intelligently control the speed of the treadmill. The user can feel more safe and stable during exercise.

BRIEF DESCRIPTION OF THE DRAWINGS

FIG. 2 is a flow chart of the intelligent speed control of the present invention;
FIG. 3 is a flow chart of acquiring the center of gravity of the human body of the present invention;
FIG. 4 is a flow chart of processing the footstep position data of the present invention;
and
FIG. 5 is a flow chart of acquiring the footstep position data of the present invention.

DETAILED DESCRIPTION OF THE PREFERRED EMBODIMENTS

Figure 1:
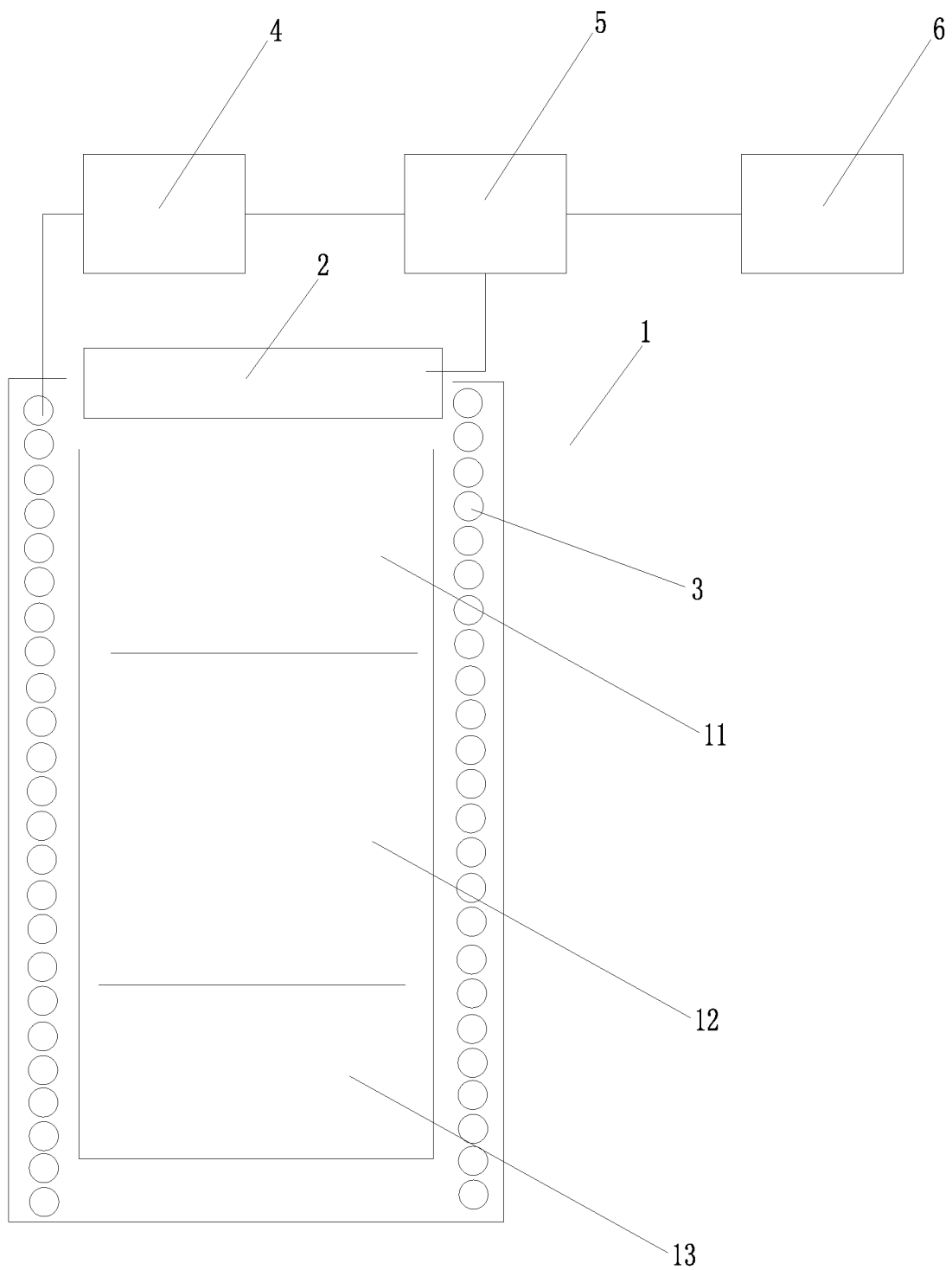
FIG. 1 is a schematic diagram of the present invention.

Embodiments of the present invention will now be described, by way of example only, with reference to the accompanying drawings.

As shown in FIG. 1, the present invention discloses an intelligent treadmill. The intelligent treadmill includes a treadmill body and an intelligent speed control system. The treadmill body includes a treadmill deck 1 and a motor 2. The treadmill deck 1 is provided with a treadmill belt connected with the motor 2. The intelligent speed control system includes a gravity-center sensing device, a processor module 4, a motor driver 5, and a host computer 6. The gravity-center sensing device includes a plurality of infrared array sensors 3. The infrared array sensors 3 are arranged at left and right sides of the treadmill deck 1, respectively. The gravity-center sensing device is sequentially connected with the processor module 4, the motor driver 5 and the host computer 6. The motor driver 5 is connected with the motor 2.

For the center of gravity to be sensed more accurately, the infrared array sensors 3 are uniformly arranged at the left and right sides of the treadmill deck 1 respectively, so that the exercise state of the user on the treadmill can be judged more accurately. This is beneficial for accurate control for the running of the treadmill.

In this embodiment, the treadmill deck 1 includes an acceleration section 11, a holding section 12, and a deceleration section 13. The acceleration section 11, the holding section 12 and the deceleration section 13 may be sequentially arranged from the front end to the rear end of the treadmill deck 1, and they may be sequentially arranged from the rear end to the front end of the treadmill deck 1, so that the user can exercise more clearly to provide convenience for the user to exercise. The numbers of the infrared array sensors 3 in the acceleration section 11, the holding section 12 and the deceleration section 13 may be adjusted by the host computer 6 to accurately and flexibly acquire the user's exercise state in each section.

Furthermore, the host computer 6 is a man-machine interface. The user operates the treadmill through the man-machine interface intuitively, which provides the user with convenience.

As shown in FIG. 2, the present invention also discloses a method for controlling an intelligent treadmill, comprising the following steps:

step 1: allowing a user to set upper and lower limit values of the position of a holding section 12 on a host computer 6;

step 2: allowing the user to set a speed adjustment ratio value on the host computer 6;

step 3: acquiring the position of the center of gravity of a human body by infrared array sensors 3;

step 4: detecting whether the center of gravity of the human body is within the holding section 12 by a processor module 4, if the center of gravity of the human body is not within the holding section 12, executing the next step, if the center of gravity of the human body is within the holding section 12, returning to the step 3;

step 5: using the processor module 4 to detect whether the center of gravity of the human body is within an acceleration section 11, if the center of gravity of the human body is not within the acceleration section 11, executing the next step, if the center of gravity of the human body is within the acceleration section 11, transmitting an acceleration signal to a motor driver 5, actuating the motor driver 5 to accelerate a motor 2, thereby completing a speed control of the treadmill. Wherein, the acceleration adjustment amount= (the actual position of the center of gravity−the upper limit value)*the speed adjustment ratio value;

step 6: using the processor module 4 to detect whether the center of gravity of the human body is within a deceleration section 13, if the center of gravity of the human body is not within the deceleration section 13, returning to the step 3, if the center of gravity of the human body is within the deceleration section 13, transmitting a deceleration signal to the motor driver 5, actuating the motor driver 5 to decelerate the motor 2, thereby completing the speed control of the treadmill. Wherein, the deceleration adjustment amount= (the lower limit value–the actual position of the center of gravity)*the speed adjustment ratio value.

For the center of gravity of the human body to be acquired more accurately, in this embodiment, as shown in FIG. 3, the step 3 includes:

step 31: the infrared array sensors 3 acquiring footstep position data of the human body and transmitting the data to the processor module 4 for processing;

step 32: the processor module 4 comparing present footstep position data with last footstep position data, if the present footstep position data is greater than the last footstep position data, returning to the step 31, if the present footstep position data is less than the last footstep position data, executing the next step;

step 33: saving the last footstep position data and recording it as a maximum value X1 of the data, at this moment, the footstep of the human body being closest to a front end of the treadmill;

step 34: the infrared array sensors 3 continuing to acquire the footstep position data of the human body and continuing to transmit the data to the processor module 4 for processing;

step 35: the processor module 4 comparing the present footstep position data with the last footstep position data, if the present footstep position data is less than the last footstep position data, returning to the step 34, if the present footstep position data is greater than the last footstep position data, executing the next step;

step 36: saving the last footstep position data and recording it as a minimum value X2 of the data, at this moment, the footstep of the human body being closest to a rear end of the treadmill;

step 37: calculating and acquiring position data X of the center of gravity of the human body, $X=(X_1+X_2)/2$.

In order to process the footstep position data more accurately, as shown in FIG. 4, the step 31 of this embodiment includes:

step 311: the infrared array sensors 3 acquiring the footstep position data of the human body;

step 312: the processor module 4 detecting whether both feet of the human body are on the treadmill deck 1, if it is detected that both feet of the human body are on the treadmill deck 1, returning to the step 311, if it is not detected that both feet of the human body are on the treadmill deck 1, executing the next step;

step 313: the processor module 4 detecting whether both feet of the human body swing on the treadmill deck 1, if it is detected that both feet of the human body swing on treadmill deck 1, returning to the step 311, if it is not detected that both feet of the human body swing on the treadmill deck 1, the present state being one-legged, and executing the next step;

step 314: the processor module 4 comparing the present footstep position data with the last footstep position data, if the present footstep position data is equal to the last footstep position data, returning to the step 311, if the present footstep position data is not equal to the last footstep position data, saving the present footstep position data;

step 315: accumulating the present footstep position data until it reaches a preset cumulative number;

step 316: detecting the cumulative number, if the accumulated number reaches the preset cumulative number, averaging the accumulated present footstep position data to acquire and save an average value of the saved footstep position data, if the accumulated number doesn't reach the preset cumulative number, executing the step 314.

In order to acquire the footstep position data more accurately, as shown in FIG. 5, the step 311 includes:

step 3110: setting infrared transmitting and receiving channels of the infrared array sensors 3;

step 3111: delaying a stabilization circuit;

step 3112: turning on the infrared array sensors 3 to perform infrared emission;

step 3113: detecting whether the infrared array sensors 3 receive a signal, if the infrared array sensors 3 receive the signal, indicating that there is no obstacle, if the infrared array sensors 3 do not receive the signal, indicating that there is an obstacle, the position of the obstacle being the footstep position of the human body, and recording corresponding data;

step 3114: recording data until all the infrared channels are scanned and saving the data.

In use, when the user's footstep is located in a different section (the acceleration section 11, the holding section 12 or the deceleration section 13), the infrared array sensors 3 quickly collect the data of the user's footstep position in the section and transmit the data to the processor module 4. The processor module 4 sends speed control commands to the motor driver 5 and the host computer 6. The motor driver 5 drives the motor 2 and controls the speed of the treadmill belt to achieve the intelligent speed control of the treadmill. The user can operate on the host computer 6 and check the relevant parameters of intelligent speed control.

If the user's footstep is in the acceleration section 11, the infrared array sensors 3 sense the signal and send the signal to the processor module 4. The processor module 4 sends an acceleration command to the motor driver 5. The motor driver 5 drives the motor 2 to speed up the treadmill belt, thereby achieving intelligent acceleration of the treadmill.

If the user's footstep is in the holding section 12, the infrared array sensors 3 sense the signal and send the signal to the processor module 4. The processor module 4 sends a constant speed command to the motor driver 5. The motor driver 5 drives the motor 2 and keeps the speed of the treadmill belt, thereby achieving intelligent speed control of the treadmill.

If the user's footstep is located in the deceleration section 11, the infrared array sensors 3 sense the signal and send the signal to the processor module 4. The processor module 4 sends a deceleration command to the motor driver 5. The motor driver drives the motor 2 to slow down the treadmill belt, thereby achieving intelligent deceleration of the treadmill.

The present invention has a reasonable structure and an ingenious design and can intelligently control the speed of the treadmill by sensing the position of the center of gravity of the human body to accurately judge the exercise state of the user on the treadmill and realize the precise somatosensory control of the running of the treadmill. It is convenient for the user to quickly and intelligently control the speed of the treadmill. The user can feel more safe and stable during exercise.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An intelligent treadmill, comprising:
a treadmill body and an intelligent speed control system;
the treadmill body including a treadmill deck and a motor, the treadmill deck having a treadmill belt driven to displace by the motor, the treadmill deck having an acceleration section, a holding section and a deceleration section defined thereon;
the intelligent speed control system including a gravity-center sensing device, a processor module, a motor driver and a host computer respectively intercoupled;
the gravity-center sensing device including a plurality of infrared array sensors arranged at left and right sides of the treadmill deck respectively, the gravity-center sensing device being connected with the processor module;
the motor driver being connected with the motor;
wherein the intelligent speed control system adjustably controls a drive speed for the treadmill belt according to an averaged user footstep position in one of the sections of the treadmill deck, the infrared array sensors acquiring a set of successive footstep positions, a maximum footstep position and a minimum footstep position over the set of successive footstep positions determined concurrently with the acquisition of the set, the intelligent speed control system averaging the user footstep position upon detection of the maximum footstep position and the minimum footstep position.

2. The intelligent treadmill as claimed in claim 1, wherein the infrared array sensors are uniformly arranged at the left and right sides of the treadmill deck, respectively.

3. The intelligent treadmill as claimed in claim 1, wherein the numbers of the infrared array sensors in the acceleration section, the holding section and the deceleration section are adjustable.

4. The intelligent treadmill as claimed in claim 1, wherein the host computer is a man-machine interface.

5. A method for controlling an intelligent treadmill, comprising:
adjustably setting upper and lower limit values of a holding section defined in position on a treadmill deck through a host computer;
selectively setting a speed adjustment ratio value through the host computer;
actuating a plurality of infrared array sensors to acquire a set of successive positions of a center of gravity of a user's body, a maximum center of gravity position and a minimum center of gravity position over the set of successive positions determined concurrently with the acquisition of the set;
executing a processor module for averaging the center of gravity positions of the user's body upon detection of the maximum center of gravity position and the minimum center of gravity position;
executing the processor module to determine whether the averaged center of gravity of the user's body is within the holding section;
if the averaged center of gravity position of the user's body is not within the holding section, executing the processor module to determine whether the averaged center of gravity position of the user's body is within an acceleration section;
if the averaged center of gravity position of the user's body is within the acceleration section, transmitting an acceleration signal to a motor driver for actuating the motor driver to accelerate a motor to responsively adjust a speed of the treadmill by an acceleration adjustment amount, wherein the acceleration adjustment amount=(an actual position of the center of gravity an upper limit value)*a speed adjustment ratio value;
if the averaged center of gravity position of the user's body is not within the acceleration section, executing the processor module to determine whether the averaged center of gravity position of the user's body is within a deceleration section; and
if the averaged center of gravity position of the user's body is within the deceleration section, transmitting a deceleration signal to the motor driver for actuating the motor driver to decelerate the motor to responsively adjust the speed of the treadmill by a deceleration adjustment amount, wherein the deceleration adjustment amount=(a lower limit value the actual position of the center of gravity)*the speed adjustment ratio value.

6. The method as claimed in claim 5, wherein the acquisition and averaging of the center of gravity positions of the user's body includes:
the infrared array sensors acquiring footstep position data of the user and transmitting the data to the processor module for processing;
the processor module comparing a present footstep position data with a last footstep position data;
if the present footstep position data is less than the last footstep position data, saving the last footstep position data as a relative maximum value X1 of the data representing the footstep of the user closest to a front end of the treadmill within the set of successive positions;
the infrared array sensors continuing to acquire the footstep position data of the user and transmit the data to the processor module for processing;
the processor module comparing the present footstep position data with the last footstep position data;
if the present footstep position data is greater than the last footstep position data, saving the last footstep position data as a minimum value X2 of the data representing the footstep of the user closest to a rear end of the treadmill within the set of successive positions;
calculating and acquiring position data X of the averaged center of gravity of the user's body, $X=(X_1+X_2)/2$.

7. The method as claimed in claim 5, wherein the acquisition and averaging of the center of gravity positions of the user's body includes:
the infrared array sensors acquiring the footstep position data of the user;
the processor module detecting whether both feet of the user are disposed on the treadmill deck;
if both feet are not detected on the treadmill deck, executing the processor module to detect whether both feet of the user swing on the treadmill deck;
if both feet are not detected to swing on the treadmill deck, a present state is confirmed to be one-legged, and executing the processor module for comparing the present footstep position data with the last footstep position data;
if the present footstep position data is not equal to the last footstep position data, saving the present footstep position data;
accumulating the present footstep position data until a preset cumulative number is reached;
if the preset cumulative number is reached, averaging the accumulated present footstep position data to acquire and save an average value of the saved footstep position.

8. The method as claimed in claim 7, wherein acquiring the footstep position data of the user includes:
- setting infrared transmitting and receiving channels for the infrared array sensors;
- delaying a stabilization circuit;
- activating the infrared array sensors for infrared emission;
- detecting whether the infrared array sensors receive the infrared emission, if the infrared array sensors receive the infrared emission, determining an absence of an obstacle, if the infrared array sensors do not receive the infrared emission, determining an occurrence of an obstacle, a position of the obstacle representing the footstep position of the user;
- recording data generated by the infrared array sensors until all the infrared channels are scanned.

* * * * *